US011937644B2

(12) United States Patent
Lee et al.

(10) Patent No.: US 11,937,644 B2
(45) Date of Patent: Mar. 26, 2024

(54) INDUCTION HEATING TYPE AEROSOL GENERATING DEVICE FOR TEMPERATURE CONTROL

(71) Applicant: KT&G CORPORATION, Daejeon (KR)

(72) Inventors: Jaemin Lee, Siheung-si (KR); Sang Kyu Park, Seoul (KR); Hyung Seok Lee, Seoul (KR); Soung Ho Ju, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 0 days.

(21) Appl. No.: 18/312,386

(22) Filed: May 4, 2023

(65) Prior Publication Data

US 2023/0309624 A1 Oct. 5, 2023

Related U.S. Application Data

(63) Continuation of application No. 17/780,706, filed as application No. PCT/KR2021/012058 on Sep. 6, 2021.

(30) Foreign Application Priority Data

Sep. 7, 2020 (KR) ........................ 10-2020-0113745
Jul. 5, 2021 (KR) ........................ 10-2021-0087858

(51) Int. Cl.
*A24F 13/00* (2006.01)
*A24F 40/20* (2020.01)
(Continued)

(52) U.S. Cl.
CPC ............ *A24F 40/465* (2020.01); *A24F 40/20* (2020.01); *A24F 40/57* (2020.01); *A24F 40/65* (2020.01);
(Continued)

(58) Field of Classification Search
CPC ...................................................... A24F 47/00
(Continued)

(56) References Cited

U.S. PATENT DOCUMENTS 9,603,386 B2 3/2017 Xiang
9,717,277 B2 8/2017 Mironov
(Continued)

FOREIGN PATENT DOCUMENTS

EP 3 900 552 A1 10/2021
JP 2009-110893 A 5/2009
(Continued)

OTHER PUBLICATIONS

Office Action dated Aug. 2, 2022 in Korean Application No. 10-2022-0083492.
(Continued)

*Primary Examiner* — Phuong K Dinh
(74) *Attorney, Agent, or Firm* — Sughrue Mion, PLLC

(57) ABSTRACT

Disclosed is an aerosol-generating device which includes a power converter for supplying an alternating power to an induction coil, and controls switching elements in the power converter to change an operation mode of a power converter based on a temperature profile such that the power converter operates in a full bridge mode in a preheating section and operates in a half bridge mode in a smoking section.

9 Claims, 14 Drawing Sheets

(51) Int. Cl.

| | |
|---|---|
| ***A24F 40/465*** | (2020.01) |
| ***A24F 40/57*** | (2020.01) |
| ***A24F 40/65*** | (2020.01) |
| ***A24F 40/95*** | (2020.01) |
| ***H05B 6/06*** | (2006.01) |
| ***H05B 6/10*** | (2006.01) |

(52) U.S. Cl.
CPC ............... *A24F 40/95* (2020.01); *H05B 6/06* (2013.01); *H05B 6/108* (2013.01)

(58) Field of Classification Search
USPC .................................................. 131/328–329
See application file for complete search history.

(56) References Cited

U.S. PATENT DOCUMENTS

| | | | | |
|---|---|---|---|---|
| 11,212,881 | B2 | 12/2021 | Fursa et al. | |
| 11,589,622 | B2 | 2/2023 | Lee | |
| 11,596,182 | B2 | 3/2023 | Lee et al. | |
| 2016/0227840 | A1 | 8/2016 | Xiang | |
| 2018/0301934 | A1 | 10/2018 | Prabhala et al. | |
| 2019/0124987 | A1 | 5/2019 | Wu et al. | |
| 2020/0022412 | A1 | 1/2020 | Abi Aoun et al. | |
| 2020/0037402 | A1 | 1/2020 | Abi Aoun et al. | |
| 2020/0037664 | A1 | 2/2020 | Fursa et al. | |
| 2021/0029786 | A1 | 1/2021 | Lee | |
| 2021/0084980 | A1 | 3/2021 | Lee et al. | |
| 2021/0093012 | A1* | 4/2021 | White .................... | H05B 6/105 |
| 2021/0127757 | A1 | 5/2021 | Lee et al. | |
| 2021/0186113 | A1 | 6/2021 | Lee | |
| 2022/0418051 | A1 | 12/2022 | Zinovik et al. | |

FOREIGN PATENT DOCUMENTS

| | | | |
|---|---|---|---|
| JP | 2020-512662 | A | 4/2020 |
| JP | 2023-512999 | A | 3/2023 |
| KR | 10-2000-0006893 | A | 2/2000 |
| KR | 10-2015-0143891 | A | 12/2015 |
| KR | 10-1648324 | B1 | 8/2016 |
| KR | 10-2018-0124755 | A | 11/2018 |
| KR | 10-2019-0084952 | A | 7/2019 |
| KR | 10-2019-0130021 | A | 11/2019 |
| KR | 10-2020-0009632 | A | 1/2020 |
| KR | 10-2020-0069904 | A | 6/2020 |
| KR | 10-2020-0078410 | A | 7/2020 |
| KR | 10-2020-0084696 | A | 7/2020 |
| KR | 10-2131278 | B1 | 7/2020 |
| WO | 2015/177256 | A1 | 11/2015 |
| WO | 2018/100495 | A1 | 6/2018 |
| WO | 2018/178114 | A3 | 10/2018 |
| WO | 2020/017783 | A1 | 1/2020 |
| WO | 2020/043900 | A1 | 3/2020 |
| WO | 2020/047417 | A1 | 3/2020 |
| WO | 2020/130752 | A1 | 6/2020 |
| WO | 2020/141718 | A1 | 7/2020 |
| WO | 2022/050800 | A1 | 3/2022 |

OTHER PUBLICATIONS

International Search Report for PCT/KR2021/012058 dated, Dec. 10, 2021 (PCT/ISA/210).

Written Opinion of the International Searching Authority for PCT/KR2021/012058 dated, Dec. 10, 2021 (PCT/ISA/237).

Korean Office Action dated Sep. 2, 2023 in Application No. 10-2021-0087858.

Korean Office Action dated Jul. 25, 2023 in Application No. 10-2023-0086658.

Extended European Search Report dated Aug. 8, 2023 in Application No. 23171357.9.

"Full-Bridge Converter" https://m.blog.naver.com/PostView.naver?isHttpsPedirect=true&blogid=iagrange0115&logNo=220920268172, 2017 (4 pages).

Japanese Office Action dated Jul. 11, 2023 in Application No. 2023-071831.

Extended European Search Report dated Mar. 28, 2023 in Application No. 21864758.4.

Notification of Reasons for Refusal dated Jun. 13, 2023 from the Japanese Patent Office in application No. 2022-545956.

Korean Office Action dated Nov. 14, 2023 in Application No. 10-2021-0087858.

Japanese Office Action dated Nov. 14, 2023 in Application No. 2023-071831.

* cited by examiner

INDUCTION HEATING TYPE AEROSOL GENERATING DEVICE FOR TEMPERATURE CONTROL

CROSS-REFERENCE TO RELATED APPLICATION

This is a continuation of U.S. application Ser. No. 17/780,706 filed on May 27, 2022, which is a national stage of International Application No. PCT/KR2021/012058 filed Sep. 6, 2021, which is based on and claims priority under 35 U.S.C. § 119 to Korean Application No. 10-2020-0113745 filed Sep. 7, 2020 and Korean Application No. 10-2021-0087858 filed Jul. 5, 2021 in the Korean Intellectual Property Office, the disclosures of which are incorporated by reference herein in their entirety.

TECHNICAL FIELD

The present disclosure relates to an aerosol-generating device, and more particularly, to an aerosol-generating device that performs induction heating.

BACKGROUND ART

Recently, demand for alternative methods for overcoming the shortcomings of general cigarettes has increased. For example, there is growing demand for an aerosol generating device that generates aerosols by heating a cigarette or an aerosol-generating material in a liquid storage without combustion.

Methods have been proposed which are different from a method of arranging a heater such as an electric resistor inside or outside a cigarette accommodated in an aerosol-generating device and heating the cigarette by supplying power to the heater. In particular, methods of heating a cigarette by an induction heating method have been actively researched.

An aerosol-generating device using the induction heating method converts direct current (DC) power into alternating current (AC) power to generate an alternating magnetic field and transmits the alternating current power to an induction coil. However, since an existing aerosol-generating device controls switching elements in the same way during its operation, the energy efficiency greatly decreases.

DISCLOSURE

Technical Problem

Technical problems to be solved by the present disclosure are to provide an aerosol-generating device capable of greatly decreasing energy loss by changing an operation mode of a power converter that supplies alternating current power to an induction coil.

The technical problems of the present disclosure are not limited to the above-described description, and other technical problems may be derived from the embodiments to be described hereinafter.

Technical Solution

According to an embodiment, an aerosol-generating device includes: a battery; a heating unit configured to heat an aerosol-generating substrate; a power converter comprising a plurality of switching elements, and configured to convert power supplied from the battery and transmit the converted power to the heating unit; and a controller configured to control the plurality of switching elements to change an operation mode of the power converter, based on a temperature profile comprising a preheating section and a smoking section.

Advantageous Effects

An aerosol-generating device of the present disclosure operates in a first mode, in which output power is high, in a preheating section in which rapid preheating is important, and operates in a second mode, in which output power is lower but the energy efficiency is higher than in the first mode, in a smoking section in which a constant heating temperature is more important than rapid heating, thereby maximizing the energy efficiency.

Also, the aerosol-generating device may synchronize a section change in a temperature profile with an operation mode change, and set a target temperature before a section change to be higher than a target temperature after the section change such that a temperature decrease caused by an operation mode change may be compensated. In other words, the aerosol-generating device may minimize additional power for reaching the target temperature by changing an operation mode at the time when the target temperature decreases.

Also, because the aerosol-generating device controls switching elements with a duty ratio, at which a power converter has a maximum efficiency, in a second mode, the energy efficiency may greatly increase.

If a heating unit is heated according to a Proportional-Integral-Derivative (PID) control method from an initial preheating point, a battery may be overloaded because of ripple components of a current. However, an aerosol-generating device of the present disclosure may prevent damage to the battery by setting an upper limit to the current in an early stage of a preheating section.

The effects of the present disclosure are not limited to the above effects, and effects that are not mentioned may be clearly understood by one of ordinary skill in the art from the present specification and the attached drawings.

BEST MODE

Figure 1:
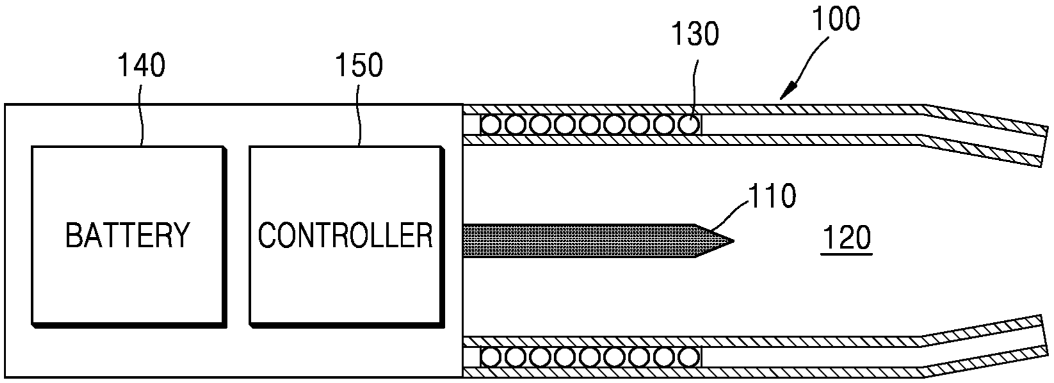
FIGS. 1 and 2 are diagrams illustrating an aerosol-generating device using an induction heating method.

According to an aspect of the present disclosure, an aerosol-generating device includes a battery, a heating unit configured to heat an aerosol-generating substrate, a power converter including a plurality of switching elements and configured to convert power supplied from the battery and transmit the power to the heating unit, and a controller configured to control the plurality of switching elements to change an operation mode of the power converter, based on a temperature profile including a preheating section and a smoking section.

The controller may be configured to change the operation mode of the power converter at the time when the preheating section is changed to the smoking section.

The controller may be configured to preheat the heating unit based on a first target temperature in the preheating section, heat the heating unit based on a second target temperature that is different from the first target temperature in the smoking section, and change the operation mode of the power converter at the time when the first target temperature is changed to the second target temperature.

The controller may be configured to set the first target temperature to be higher than the second target temperature.

The controller may be configured to control the plurality of switching elements to make the power converter operate in a first mode, in the preheating section, and control the plurality of switching elements to make the power converter operate in a second mode that is different from the first mode, in the smoking section.

The controller may be configured to control the plurality of switching elements to make the power converter operate as a full-bridge circuit in the first mode, and control the plurality of switching elements to make the power converter operate as a half-bridge circuit in the second mode.

The preheating section may include a first sub-section and a second sub-section following the first sub-section, and the controller may be configured to control the power converter such that a current supplied to the heating unit does not exceed a predetermined upper limit in the first sub-section.

The controller may be configured to control the power converter based on a first duty ratio, in the second sub-section.

The controller may be configured to control the power converter based on a second duty ratio, which is different from the first duty ratio, in the smoking section after the second sub-section.

The first duty ratio may be lower than the second duty ratio.

The power converter may include a first lag including a first switching element and a second switching element, and a second lag including a third switching element and a fourth switching element and connected to the first lag in parallel, and the heating unit may be connected to a node between the first switching element and the second switching element, and may be connected to a node between the third switching element and the fourth switching element.

The controller may be configured to control the first switching element and the second switching element to operate complementarily, and control the third switching element and the fourth switching element to operate complementarily, in the preheating section.

The controller may be configured to control the first switching element and the second switching element to operate complementarily while the third switching element is off and the fourth switching element is on, in the smoking section.

The power converter may be configured to convert direct current power from the battery into alternating current power, and the heating unit may include a coil configured to generate an alternating magnetic field based on the alternating current power.

The heating unit may further include a susceptor configured to generate heat by the alternating magnetic field.

MODE FOR INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er," "-or," and "module" described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The term "cigarette" may refer to an article which can be loaded on an aerosol generating device to serve as a mouthpiece for a user. The cigarette may have a shape and a structure similar to those of a traditional combustive cigarette. This cigarette may contain an aerosol generating material that generates aerosols by operation (e.g., heating) of an aerosol generating device. Alternatively, the cigarette may not include an aerosol generating material and delivers an aerosol generated from another article (e.g., cartridge) installed in the aerosol generating device to the user's mouth.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

Figure 2:
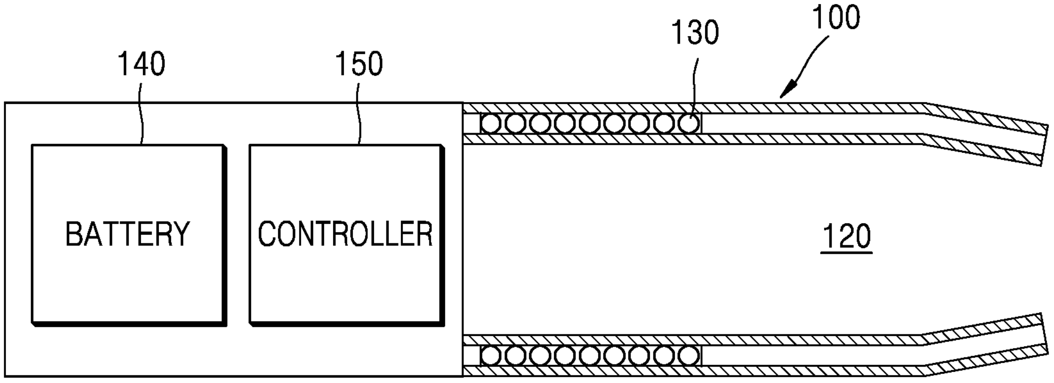

FIGS. 1 and 2 are diagrams illustrating an aerosol-generating device using an induction heating method.

Referring to FIG. 1, an aerosol-generating device 100 may include a susceptor 110, a coil 130, a battery 140, and a controller 150. According to an embodiment, the susceptor 110 may be included in a cigarette (e.g., a cigarette 200 of FIGS. 3 and 4). In this case, the aerosol-generating device 100 may not include the susceptor 110, as illustrated in FIG. 2.

The aerosol-generating device 100 of FIGS. 1 and 2 includes components related to the present embodiment. Therefore, one of ordinary skill in the art may understand that additional general-purpose components other than the components of FIGS. 1 and 2 may be further included in the aerosol-generating device 100.

The aerosol-generating device 100 may generate aerosols by heating the cigarette 200 accommodated in an accommodation space 120 by an induction heating method. The induction heating method may indicate a method in which a magnetic substance is heated by an alternating magnetic field that changes its direction periodically.

When an alternating magnetic field is applied to the magnetic substance, energy may be lost in the magnetic substance because of eddy currents and hysteresis loss, and the lost energy may be emitted from the magnetic substance as heat energy. As an amplitude or a frequency of an alternating magnetic field applied to the magnetic substance increases, more heat energy may be emitted from the magnetic substance. The heat energy may be transferred to the cigarette 200.

The magnetic substance heated by an external magnetic field may be the susceptor 110. The susceptor 110 may be in the form of a piece, a flake, or a strip.

The susceptor 110 may include metal or carbon. The susceptor 110 may include at least one of ferrite, ferromagnetic alloy, stainless steel, and aluminum (Al). Also, the susceptor 110 may include at least one of ceramic such as graphite, molybdenum, silicon carbide, niobium, nickel alloy, a metal film, or zirconia, a transition element such as nickel (Ni) or cobalt (Co), and a metalloid such as boron (B) or phosphorus (P).

The aerosol-generating device 100 may include the accommodation space 120 in which the cigarette 200 is accommodated. The accommodation space 120 may include an opening for receiving the cigarette 200. The cigarette 200 may be inserted into the aerosol-generating device 100 through the opening of the accommodation space 120.

As illustrated in FIG. 1, the susceptor 110 may be arranged in the accommodation space 120. The susceptor 110 may be attached to a bottom of the accommodation space 120. The cigarette 200 may be pushed down to the bottom of the accommodation space 120 such that the susceptor 110 is inserted into the cigarette 200.

Alternatively, as illustrated in FIG. 2, the aerosol-generating device 100 may not include the susceptor 110. In this case, the susceptor 110 may be included in the cigarette 200.

The aerosol-generating device 100 may include the coil 130 which applies the alternating magnetic field to the susceptor 110 and varies the resonance frequency according to a temperature change of the susceptor 110 that is caused by induction heating of the susceptor 110.

The coil 130 may be a solenoid. The coil 130 may be a solenoid wound around the accommodation space 120, and the cigarette 200 may be accommodated in an internal space of the solenoid. A material of a conducting wire forming the solenoid may include copper (Cu). However, the material is not limited thereto. The material may be a material allowing a high current to flow because of a low non-resistance value, and examples of the material may include silver (Ag), gold (Au), aluminum (Al), tungsten (W), zinc (Zn), nickel (Ni), or an alloy including at least one of the materials listed above.

The coil 130 may be wound around the accommodation space 120 and may be at a location corresponding to the susceptor 110.

The battery 140 may supply power to the coil 130. The battery 140 may be a lithium iron phosphate ($LiFePO_4$) battery, but is not limited thereto. For example, the battery may be a lithium cobalt oxide ($LiCoO_2$) battery, a lithium titanate battery, or the like.

The controller 150 may control the power supplied to the coil 130. The controller 150 may change a driving frequency of the coil 130. The controller 150 may control induction heating of the susceptor 110 by controlling the driving frequency.

Figure 3:
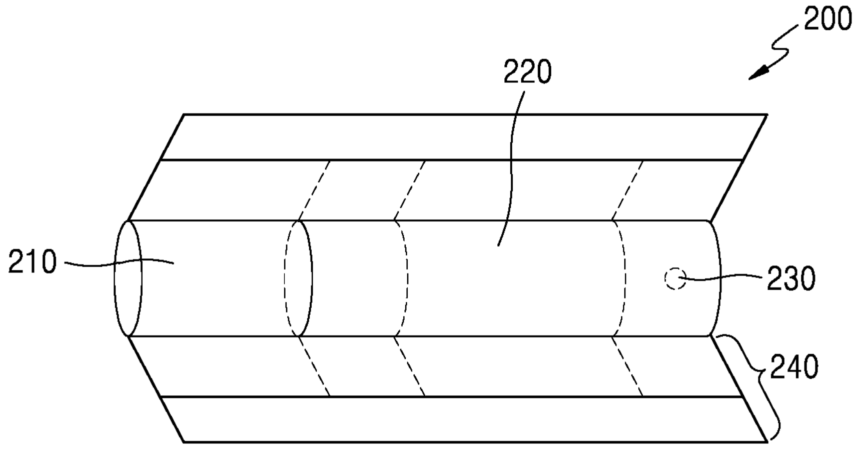
FIGS. 3 and 4 illustrate examples of a cigarette.
Figure 4:
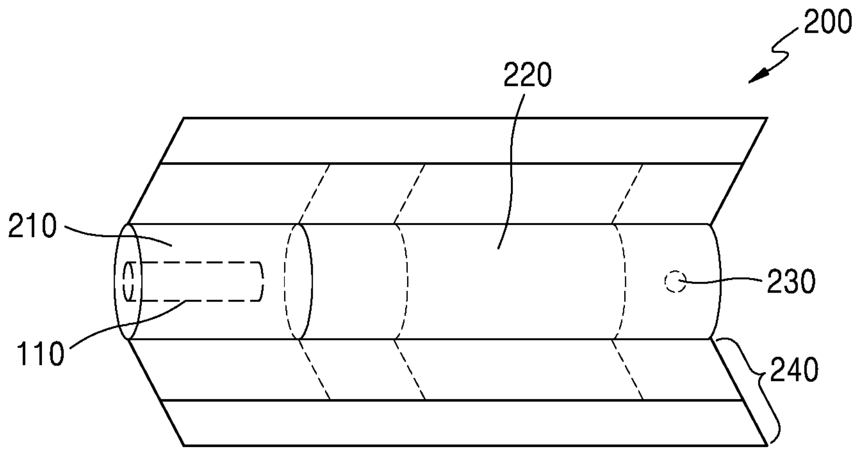

FIGS. 3 and 4 illustrate examples of a cigarette.

Referring to FIGS. 3 and 4, the cigarette 200 may include a tobacco rod 210 and a filter rod 220. The filter rod 220 may include one or more segments. For example, the filter rod 220 may include a first segment configured to cool an aerosol and a second segment configured to filter a certain component included in the aerosol. Also, the filter rod 220 may further include at least one segment configured to perform other functions.

The cigarette 200 may be packaged by at least one wrapper 240. The wrapper 240 may have at least one hole through which external air may be introduced or internal air may be discharged. For example, the cigarette 200 may be packaged by a single wrapper. As another example, as shown in FIGS. 3 and 4, the cigarette 200 may be double-packaged by at least two wrappers 240. For example, the tobacco rod 210 may be packaged by a first wrapper, and the filter rod 220 may be packaged by a second wrapper. Also, the tobacco rod 210 and the filter rod 220, which are respectively packaged by separate wrappers, may be coupled to each other, and the entire cigarette 200 may be re-packaged by a third wrapper.

The tobacco rod 210 may include an aerosol-generating material. For example, the aerosol-generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 210 may include other additives, such as flavors, a wetting agent, and/or organic acid. Also, the tobacco rod 210 may include a flavored liquid, such as menthol or a moisturizer, which is injected to the tobacco rod 210.

The tobacco rod 210 may be manufactured in various forms. For example, the tobacco rod 210 may be formed as a sheet or a strand. Also, the tobacco rod 210 may be formed as a pipe tobacco, which is formed of tiny bits cut from a tobacco sheet.

According to an embodiment, the cigarette 220 may further include the susceptor 110. In this case, as illustrated in FIG. 4, the susceptor 110 may be arranged on the tobacco rod 210. The susceptor 110 may extend in a direction towards the filter rod 220 from an end portion of the tobacco rod 210.

The tobacco rod 210 may be wrapped with a heat conductive material. For example, the heat-conducting material may be, but is not limited to, a metal foil such as an aluminum foil. For example, the heat conductive material surrounding the tobacco rod 210 may uniformly distribute heat transmitted to the tobacco rod 210, and thus, the heat conductivity applied to the tobacco rod may be increased and a flavor of the aerosol generated from the tobacco rod 210 may be improved.

The filter rod 220 may include a cellulose acetate filter. Shapes of the filter rod 220 may vary. For example, the filter rod 220 may include a cylinder-type rod or a tube-type rod having a hollow. Also, the filter rod 220 may include a recess-type rod including a cavity. When the filter rod 220 includes a plurality of segments, the plurality of segments may have different shapes.

The filter rod 220 may be formed to generate flavors therefrom. For example, a flavoring liquid may be injected onto the filter rod 220, or an additional fiber coated with a flavoring liquid may be inserted into the filter rod 220.

Also, the filter rod 220 may include at least one capsule 230. The capsule 230 may generate a flavor or an aerosol. For example, the capsule 230 may have a configuration in which a liquid containing a flavoring material is wrapped with a film. For example, the capsule 230 may have a spherical or cylindrical shape, but is not limited thereto.

When the filter rod 220 includes a segment configured to cool the aerosol, the cooling segment may include a polymer material or a biodegradable polymer material. For example, the cooling segment may include pure polylactic acid alone. In some embodiments, the cooling segment may include a cellulose acetate filter having a plurality of holes. However, the cooling segment is not limited thereto and may include a configuration, in which an aerosol is cooled, and an aerosol cooling material.

Figure 5:
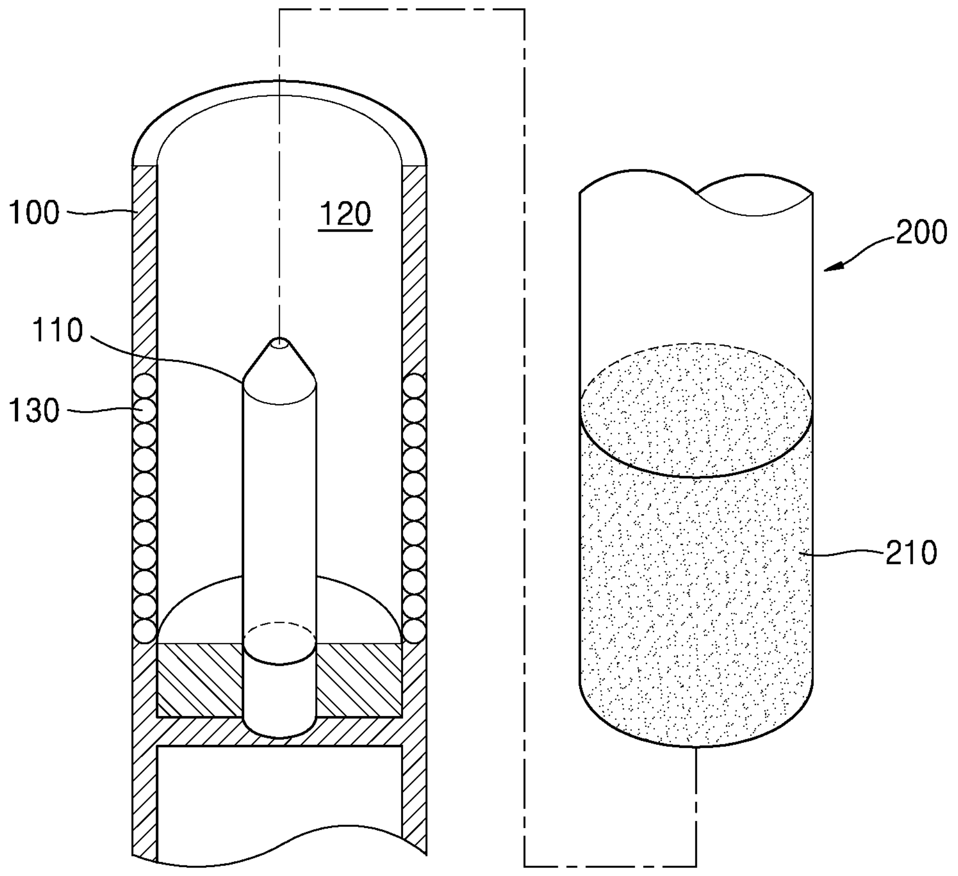
FIGS. 5 and 6 illustrate examples of a cigarette inserted into an aerosol-generating device.
Figure 6:
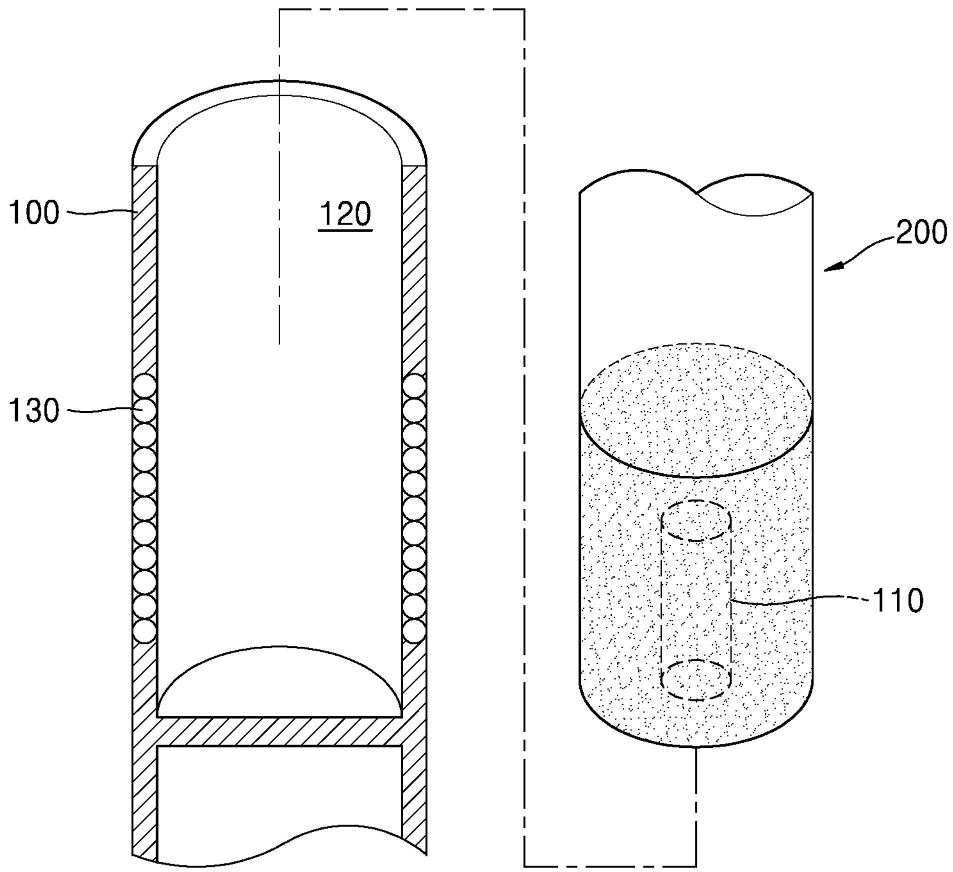

FIGS. 5 and 6 illustrate examples of a cigarette inserted into an aerosol-generating device.

In more detail, FIG. 5 illustrates an example in which the susceptor 110 is arranged on the aerosol-generating device 100, and FIG. 6 illustrates an example in which the susceptor 110 is arranged on the cigarette 200.

Referring to FIG. 5, the cigarette 200 may be accommodated in the accommodation space 120 in a lengthwise direction of the cigarette 200. The susceptor 110 may be inserted into the cigarette 220 accommodated in the aerosol-generating device 100 such that the tobacco rod 210 may contact the susceptor 110. The susceptor 110 may extend in a lengthwise direction of the aerosol-generating device 100 such that the susceptor 110 may be inserted into the cigarette 200.

The susceptor 110 may be at the center of the accommodation space 120 to be inserted into a central portion of the cigarette 200. FIG. 5 illustrates a single susceptor 110, but the number of the susceptor 110 is not limited thereto. In other words, the aerosol-generating device 100 may include multiple susceptors that extend in the lengthwise direction of the aerosol-generating device 100 to be inserted into the cigarette 200.

The coil 130 may be wound around the accommodation space 120 along the lengthwise direction of the accommodation space 120. In the lengthwise direction of the accommodation space 120, the coil 130 may extend to a length corresponding to the susceptor 110 and may be at a location corresponding to the susceptor 110.

Referring to FIG. 6, the cigarette 200 may be accommodated in the accommodation space 120 in a lengthwise direction of the cigarette 200. As the cigarette 200 is accommodated in the accommodation space 120, the susceptor 110 may be surrounded by the coil 130.

The susceptor 110 may be at the center of the tobacco rod 210 for uniform heat transmission. FIG. 6 illustrates a single susceptor 110, but the number of the susceptor 110 is not limited thereto. In other words, a plurality of susceptors may be included in the cigarette 200.

The coil 130 may be wound around the accommodation space 120 along the lengthwise direction of the accommodation space 120. The coil 130 may extend, in the lengthwise direction, to the length corresponding to the susceptor 110 and may be at a location corresponding to the susceptor 110.

Figure 7:
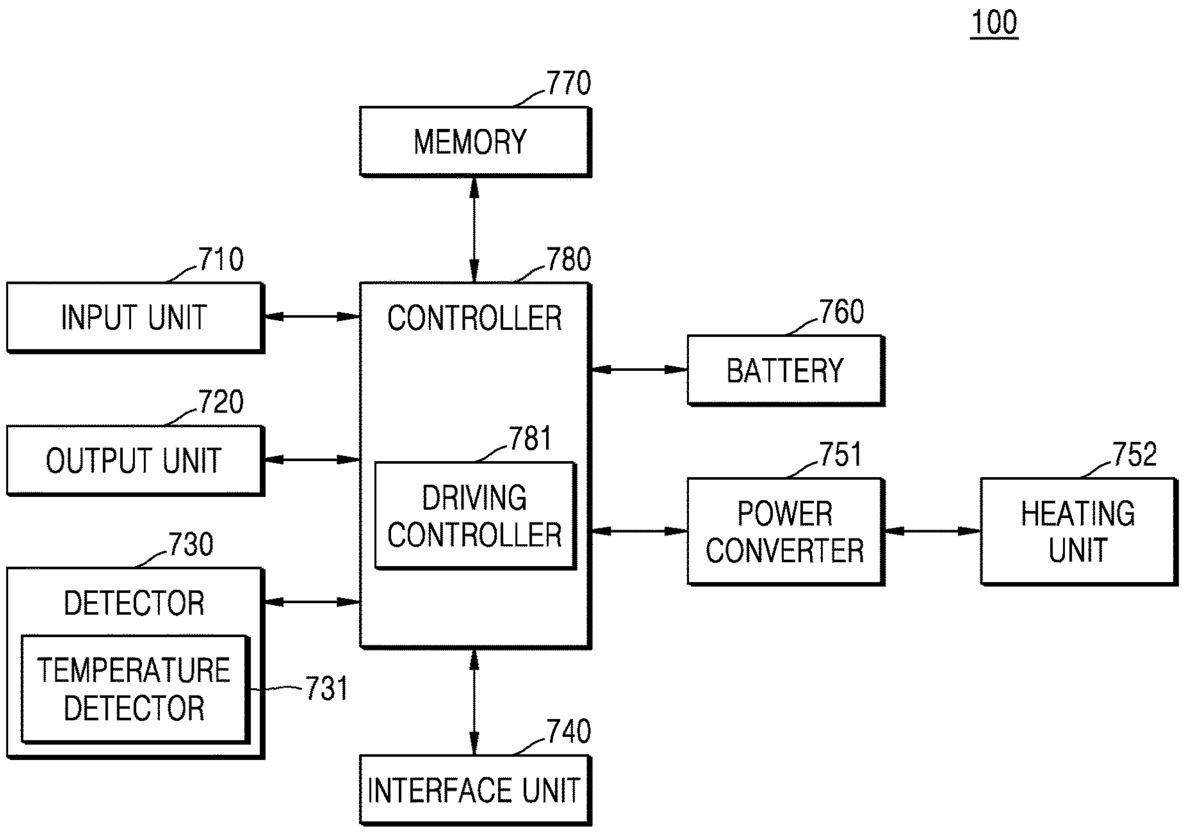
FIG. 7 is a block diagram of an aerosol-generating device according to an embodiment.

FIG. 7 is a block diagram of an aerosol-generating device, according to an embodiment.

Referring to FIG. 7, the aerosol-generating device 100 may include an input unit 710, an output unit 720, a detector 730, an interface unit 740, a power converter 751, a heating unit 752, a battery 760, a memory 770, and a controller 780. The battery 760 and the controller 780 of FIG. 7 may respectively correspond to the battery 140 and the controller 150 of FIGS. 1 and 2. The heating unit 752 of FIG. 7 may correspond to the coil 130 of FIGS. 1 and 2. According to an embodiment, the heating unit 752 of FIG. 7 may include the susceptor 110 of FIG. 1.

The input unit 710 may receive a user input. For example, the input unit 710 may be a press-type push button, but is not limited thereto. When the input unit 710 receives a user input, a control signal corresponding to the user input may be transmitted to the controller 780. The controller 780 may control internal components of the aerosol-generating device 100 in response to the control signal. For example, the controller 780 may supply power to the heating unit 752 in response to the control signal.

The output unit 720 may output visual information and/or tactile information associated with the aerosol-generating device 100. To this end, the output unit 1020 may include a display (not illustrated), a vibration motor (not illustrated), and the like.

The detector 730 may detect information related to the operation of the aerosol-generating device 100. In an embodiment, the detector 730 may include a temperature detector 731 for detecting a temperature of the heating unit 752. The temperature detector 731 may include at least one temperature sensor, and the temperature sensor may be arranged adjacent to the heating unit 752. According to an embodiment, the detector 730 may further include a puff sensor for detecting a user's puff.

The interface unit 740 may function as a passage to external devices of various types that are connected to the aerosol-generating device 100. For example, the interface unit 740 may include a port that may be connected to an external device, and the aerosol-generating device 100 may be connected to the external device through the port. While connected to the external device, the aerosol-generating device 100 may exchange data with the external device. The interface unit 740 may function as a passage through which external power is supplied. For example, the interface unit 740 may include a port that may be connected to an external device, and the aerosol-generating device 100 may receive external power from an external power supply while the aerosol-generating device 100 is connected to the external power supply.

The heating unit 752 may heat an aerosol-generating substrate. As the aerosol-generating substrate is heated, an aerosol may be generated. The aerosol-generating substrate may be the cigarette 200 of FIGS. 3 and 4.

The heating unit 752 may include the coil 130. Also, the heating unit 752 may further include a capacitor (C of FIG. 9) to be inductively coupled to the susceptor 110. According to an embodiment, the heating unit 752 may further include the susceptor 110.

When the current is applied to the coil 130, the susceptor 110 may be heated by an alternating magnetic field generated in the coil 130. The heated susceptor 110 may heat the aerosol-generating substrate, and thus, the aerosol may be generated.

According to an embodiment, the heating unit 752 may not include the susceptor 110, and the susceptor 110 may be included in the aerosol-generating substrate. In this case, the heating unit 752 may be referred to as a magnetic field generator.

The battery 760 may supply power to the heating unit 752 under the control of the controller 780. In this case, the power converter 751 may convert the power supplied from the battery 760 and transmit the converted power to the heating unit 752.

The power converter 751 may convert DC power supplied from the battery 760 to AC power and may transmit the AC power to the heating unit 752. The power converter 751 may include switching elements for converting the DC power to AC power.

The memory 770 may store information used to operate the aerosol-generating device 100. In an embodiment, the memory 770 may store information regarding temperature profiles.

The temperature profile may include information regarding a target temperature corresponding to a heating section. The heating section may include a preheating section, in which a temperature of the susceptor 110 increases to a preset preheating temperature, and a smoking section, in which the temperature of the susceptor 110 is maintained in a certain range. The target temperature in the preheating section may be set to be higher than the target temperature in the smoking section. For example, the target temperature in the preheating section may be set to be about 340° C., and the target temperature in the smoking section may be set to be about 335° C.

The controller 780 may control the temperature of the heating unit 752, based on a difference between the temperature of the heating unit 752 and the target temperature. In other words, the controller 780 may perform feedback control based on temperature information of the heating unit 752.

In detail, the controller 780 may control the power supplied to the heating unit 1052 according to a feedback control method using a difference between the temperature of the heating unit 1052 and the target temperature, an integral value of the difference over time, and a differential value of the difference over time.

In an embodiment, the controller 780 may control the temperature of the heating unit 752 according to a Proportional-Integral-Derivative (PID) control method. A coefficient of the PID control may be experimentally set in advance so that the temperature of the heating unit 752 may be optimally controlled. The controller 780 may control the temperature of the heating unit 752 to make the temperature of the heating unit 752 reach the target temperature according to the coefficient of the PID control.

The controller 780 may control the power supplied to the heating unit 752 by controlling the power converter 751. The controller 780 may control the power converter 751 by using a Pulse Width Modulation (PWM) method. The controller 780 may control switching elements included in the power converter 751 by using the PWM method. To this end, the controller 780 may include a driving controller 781 that controls the switching elements. According to an embodiment, the driving controller 780 may be formed as an individual component distinct from the controller 780.

In general, the power converter 751 may have the maximum efficiency at a specific duty. For example, the power converter 751 may operate at maximum power efficiency when the duty is about 50%. The duty may indicate a percentage of a time period during which the switching elements are turned on in one switching period. Therefore, in the present specification, the duty may be identical to a duty ratio.

According to the related art, after the power converter 751 includes a full-bridge circuit, the switching elements operate only in a full-bridge mode. Alternatively, according to the related art, when the power converter 751 includes a half-bridge circuit, the switching elements operate only in a half-bridge mode. However, if the power converter 751 includes the full-bridge circuit and is controlled for the maximum power efficiency at a fixed duty in all heating sections, it is difficult to decrease the temperature of the heating unit 752 in the smoking section. On the other hand, if the power converter 751 includes the half-bridge circuit and is controlled for the maximum power efficiency at a fixed duty in all heating sections, rapid preheating may be difficult in the preheating section because of low output power of the half-bridge circuit.

To solve the problems above, according to embodiments, the power converter 751 including the full-bridge circuit may change the operation mode according to the temperature profile so that the power converter 751 may have the improved power efficiency.

In more detail, the controller 780 may control the switching elements to change the operation mode of the power converter 751, based on the temperature profile about the preheating section and the smoking section.

The controller 780 may change an operation mode of the power converter 751 so that the aerosol-generating device 100 may operate at the maximum efficiency. The operation mode may include a first mode and a second mode. In an embodiment, the first mode may be a mode in which the power converter 751 operates as a full-bridge circuit. Also, the second mode may be a mode in which the power converter 751 operates as a half-bridge circuit. The power converter 751 may output first power in the first mode and output second power in the second mode, wherein the second power is less than the first power.

The controller 780 may change the mode of the power converter 751 based on a temperature profile. In the preheating section, the controller 780 may control the switching elements included in the power converter 751 to make the power converter 751 operate in the first mode. Also, in the smoking section after the preheating section, the controller 780 may control the switching elements included in the power converter 751 to make the power converter 751 operate in the second mode different from the first mode.

The preheating section and the smoking section may have different the target temperatures and/or the heating times. The controller 780 may control the power converter 751 to make the temperature of the susceptor 110 reach the target temperature. During a first heating time, the controller 780 may control the power converter 751 based on the first target temperature. Also, during a second heating time, the controller 780 may control the power converter 751 based on the second target temperature. The first heating time may correspond to the preheating section, and the second heating time may correspond to the smoking section. The first heating time may be less than the second heating time.

In a portion of the preheating section, the controller 780 may control the power converter 751 based on the first duty. Also, in the smoking section, the controller 780 may control the power converter 751 based on the second duty different from the first duty. The second duty may be set so that the power converter 751 may operate at the maximum power efficiency. For example, the second duty may be about 50%. The first duty may be less than the second duty. For example, the first duty may be about 40%. The reason for setting the first duty to be less than the second duty, even though the power efficiency is maximum at the second duty, is to ease a temperature decrease of the heating unit 752 in the smoking section.

Since the power converter 751 includes the switching elements, it may be difficult to accurately control the temperature of the susceptor 110 at the time of switching the operation modes because of a software problem such as signal latency or a hardware problem such as an on/off delay of the switching elements. For example, at the time of changing the operation mode, the temperature of the susceptor 110 may drop. When the target temperature is to be uniformly maintained despite the temperature drop, additional power is required to increase the temperature of the susceptor 110 to the target temperature. Such additional power is unexpected power and causes the energy loss.

According to an embodiment, in order to solve this problem, the first target temperature may be set to be higher than the second target temperature, and the operation mode may change when the target temperature decreases. In other words, the aerosol-generating device 100 may minimize the energy loss by synchronizing the temperature profile switching with the operation mode switching.

In more detail, the controller 780 may change the operation mode of the power converter 751 at the time when the first target temperature is changed to the second target temperature. Because the second target temperature is lower than the first target temperature, the additional power required for the power converter 751 may greatly decrease. Accordingly, the energy loss of the power converter 751 may be minimized.

Figure 8:
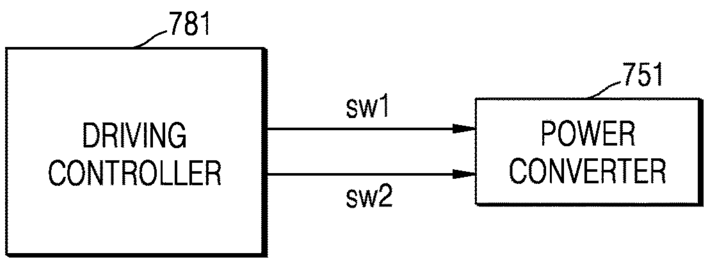
FIG. 8 is a diagram illustrating an operation method of a driving controller of FIG. 7.

FIG. 8 is a diagram of an operation method of a driving controller of FIG. 7.

Referring to FIG. 8, a driving controller 781 may provide switching signals sw1 and sw2 to the power converter 751. Switching signals may include on/off information of switching elements, duty information, and the like. The power converter 751 may operate in the first mode or the second mode in response to the switching signals sw1 and sw2.

The driving controller 781 may output a first switching signal sw1 to make the power converter 751 operate in the first mode in the preheating section. The power converter 751 may operate as a full-bridge circuit in response to the first switching signal sw1.

The driving controller 781 may output a second switching signal sw2 to make the power converter 751 operate in the second mode in the smoking section. The power converter 751 may operate as a half-bridge circuit in response to the second switching signal sw2.

Figure 9:
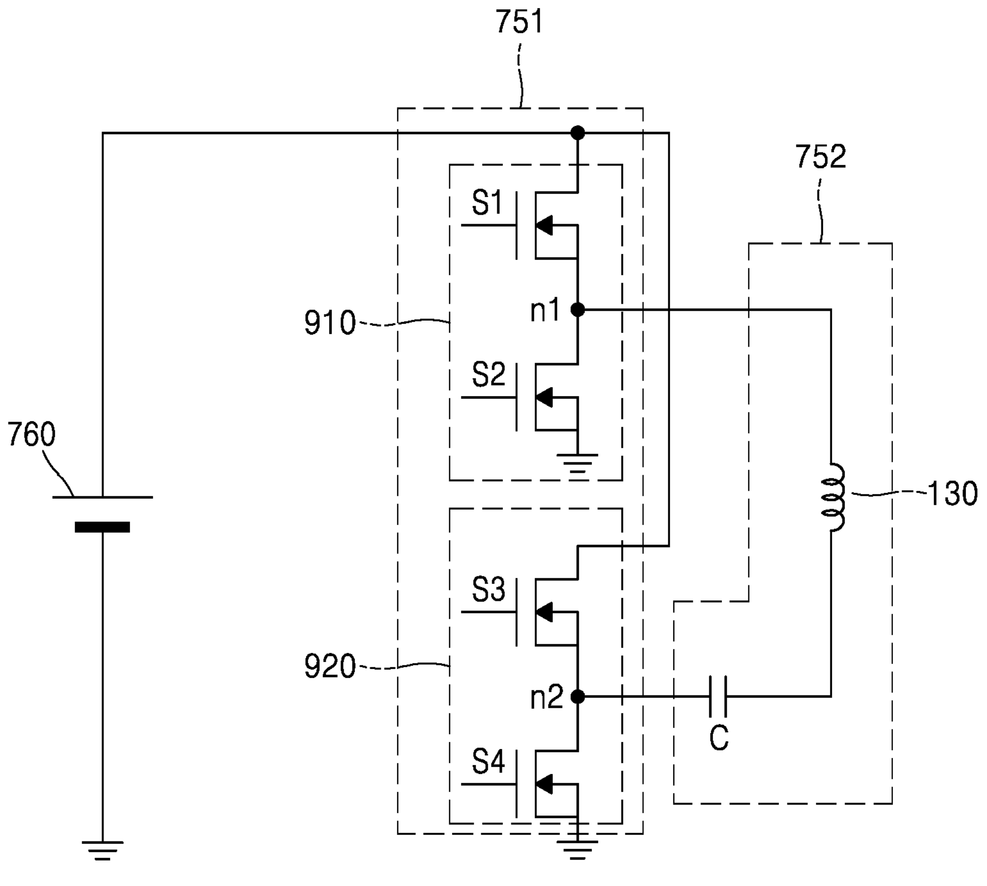
FIG. 9 is an internal circuit diagram of a power converter and a heating unit, according to an embodiment.

FIG. 9 is an internal circuit diagram of a power converter and a heating unit, according to an embodiment.

Referring to FIG. 9, the power converter 751 may include a first lag 910, which includes the first switching element S1 and the second switching element S2, and a second lag 920, which includes the third switching element S3 and the fourth switching element S4 and is connected to the first lag 910 in parallel.

The first to fourth switching elements S1 to S4 may be bidirectional switching elements. For example, the first to fourth switching elements S1 to S4 may each be a field effect transistor (FET), but are not limited thereto.

The first switching element S1 and the second switching element S2 may be connected to each other in series. Also, the third switching element S3 and the fourth switching element S4 may be connected to each other in series. The first lag 910 including the first switching element S1 and the second switching element S2 may be connected to the second lag 920 including the third switching element S3 and the fourth switching element S4 in parallel. The first lag 910 and the second lag 920 may be connected to the battery 760 in parallel.

The heating unit 752 may be connected between a first node n1, which is a node disposed between the first switching element S1 and the second switching element S2, and a second node n2, which is a node disposed between the third switching element S3 and the fourth switching element S4.

In more detail, the heating unit 752 may include the coil 130 and a capacitor C connected to the coil 130 in series. The capacitor C may be a device prepared for the resonance with the susceptor 110. According to an embodiment, the capacitor C may be connected to the coil 130 in parallel.

The first node n1 may be positioned between the first switching element S1 and the second switching element S2, and the second node n2 may be positioned between the third switching element S3 and the fourth switching element S4. Also, the coil 130 and the capacitor C may be connected between the first node n1 and the second node n2.

The controller 780 may control the power supplied to the coil 130 by controlling operations of the first to fourth switching elements S1 to S4.

FIG. 9 only illustrates certain components related to the present embodiment. Therefore, one of ordinary skill in the art will understand that additional general-purpose components other than the components of FIG. 9 may be further included in the aerosol-generating device 1. For example, the power converter 751 may further include diode devices that are respectively connected in parallel to the first to fourth switching elements S1 to S4 to prevent a reverse current.

Figure 10:
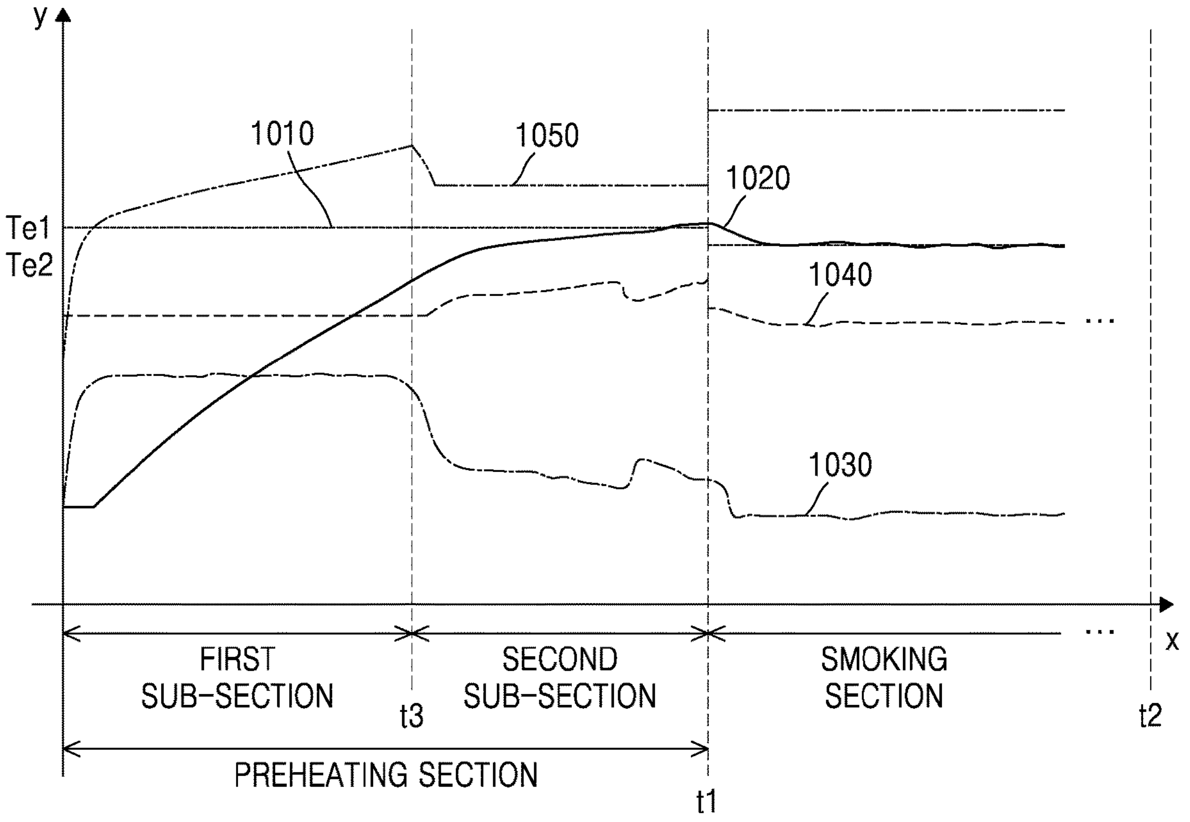
FIG. 10 is a diagram illustrating a method of changing an operation mode according to a temperature profile, according to an embodiment.

FIG. 10 is a diagram illustrating a method of changing an operation mode based on a temperature profile, according to an embodiment.

Referring to FIG. 10, the graph shows a target temperature 1010 of the susceptor 110, a temperature 1020 of the susceptor 110, a current 1030 supplied to the coil 130, a matching frequency 1040 between the coil 130 and the susceptor 110, and a duty 1050 of the power converter 751. Referring to FIG. 10, the x axis indicates time, and the y axis indicates any one of a current (A), a frequency (Hz), a temperature (° C.), and a duty (%).

The controller 780 may heat the susceptor 110 according to the temperature profile. The temperature profile may include information regarding the target temperature 1010 and a heating time. The temperature profile may be divided into the preheating section and the smoking section, based on the target temperature 1010 and/or the heating time. The preheating section indicates a section in which the temperature 1020 of the susceptor 110 increases to a preheat temperature set in advance. For example, the preheat temperature may be about 340° C. but is not limited thereto. The smoking section indicates a section in which the user's puffs actually occur and the temperature 1020 of the susceptor 110 is maintained in a preset smoking temperature range. For example, the smoking temperature range may be between about 330° C. and about 340° C., but is not limited thereto.

According to the temperature profile, the controller 780 may preheat the susceptor 110 based on a first target temperature Te1 until the time point t1. The time point t1 may correspond to the end of the preheating section. In the preheating section, the controller 780 may control the power converter 751 to make the temperature 1020 of the susceptor 110 reach the first target temperature Te1.

After the time point t1, the controller 780 may heat the susceptor 110 based on a second target temperature Te2 that is lower than the first target temperature Te1, until the time point t2. The period between the time point t1 and the time point t2 may correspond to the smoking section. In the smoking section, the controller 780 may control the power converter 751 to maintain the temperature 1020 of the susceptor 110 to the second target temperature Te2.

In the preheating section, the controller 780 may control the switching elements to make the power converter 751 operate in the first mode. The first mode may be a mode in which the power converter 751 operates the full-bridge circuit.

The preheating section may be divided into a first sub-section and a second sub-section following the first sub-section. The first sub-section and the second sub-section may be determined according to the temperature 1020 of the susceptor 110. The controller 780 may heat the susceptor 110 based on the first target temperature Te1 until the time point t3 which precedes the time point t1. For example, the time point t3 may be set such that the temperature 1020 of the susceptor 110 in the first sub-section is in a range of (Te1-200) ° C. to (Te1-30) ° C.

In the first sub-section, the controller 780 may control the power converter 751 in a first sub-mode. The first sub-mode may be a mode in which an upper limit is set for the current 1030 supplied to the coil 130 to remove ripple components. Also, the first sub-mode may be a mode in which temperature feedback control is not performed.

In the first sub-section, the controller 780 may set an upper limit of the supplied current 1030. Also, in the first sub-section, the controller 780 may fix the matching frequency 1040. In the first sub-section, the controller 780 may heat the susceptor 110 by controlling the duty 1050 of the power converter 751 based on the first target temperature Te1.

In detail, the controller 780 may limit a magnitude of the supplied current 1030 to be less than or equal to a preset reference current in the first sub-section. For example, the reference current may be set to a value in a range of about 1 A to about 4 A. The reason for setting the lower end of the range to 1 A is that the minimum current required to heat the coil 130 is 1 A. In addition, the reason for setting the upper end of the reference current is set to 4 A is that the rated current of the battery 760 is 6 A, and the sum of the required currents of the components other than the heating unit 752 is 2 A. For example, the reference current may be set to about 1.95 A.

Also, the controller 780 may fix the matching frequency 1040 in the first sub-section. The matching frequency 1040 may be set based on resonance frequency of the coil 130 and a capacitor C. In an embodiment, the matching frequency 1040 may be set to be higher than the resonance frequency by a preset value, but is not limited thereto.

In the first sub-section, the controller 780 may not perform the temperature feedback control. Also, the control unit 780 may increase the temperature 1020 of the susceptor 110 by increasing the duty 1050 of the power converter 751 while the magnitude of the supply current 1030 is kept under the upper limit and the matching frequency 1040 remains constant in the first sub-section. For example, the controller 780 may increase the duty 1050 of the power converter 751 to about 45%.

In the second sub-section, the controller 780 may control the power converter 751 based on the second sub-mode. The second sub-mode may be a mode in which the current is not limited for rapid preheating. Also, the second sub-mode may be a mode in which the temperature feedback control is performed to make the temperature 1020 of the susceptor 110 reach the first target temperature Te1. In the second sub-mode, the power converter 751 may output power greater than that in the second mode described below. The reason for not controlling the power converter 751 in the second sub-mode from the beginning of the preheating is to prevent the damage to the battery 760 which may be caused by the ripple components of the current.

The controller 780 may fix the duty 1050 of the power converter 751 in the second sub-section. In an embodiment, in the second sub-section, the controller 780 may maintain the duty 1050 of the power converter 751 at a first duty. The first duty may be set to be 5% lower than a maximum duty value in the first sub-section. For example, the first duty may be set to be about 40%. The controller 780 may heat the susceptor 110 by controlling the current 1030 supplied to the coil 130 and/or the matching frequency 1040 based on the first target temperature Te1 in the second sub-section.

In detail, in the second sub-section, the controller 780 may maintain the duty 1050 of the power converter 751 at the first duty. Also, in the second sub-section, the controller 780 may perform feedback control based on a difference between the temperature 1020 of the susceptor 110 and the first target temperature Te1. The controller 780 may control the temperature 1020 of the susceptor 110 by the PID control method. The controller 780 may control the current 1030 supplied to the coil 130 and/or the matching frequency 1040 to make the temperature 1020 susceptor 110 reach the first target temperature Te1, according to a coefficient of the PID control.

In the smoking section, the controller 780 may control the switching elements to make the power converter 751 operate in the second mode that is different from the first mode. The second mode may indicate a mode in which the power converter 751 operates as a half-bridge circuit. Also, the second mode may indicate a mode in which the temperature 1020 of the susceptor 110 is maintained at the maximum power efficiency. In the second mode, the power converter 751 may output power less than that in the first mode and may operate at the maximum power efficiency.

In the smoking section, the controller 780 may fix the duty 1050 of the power converter 751. In an embodiment, in the smoking section, the controller 780 may maintain the duty 1050 of the power converter 751 at a second duty. The second duty may be greater than the first duty. The second duty may be set to achieve the maximum power efficiency of the power converter 751. For example, the second duty may be set to be about 50%. In the smoking section, the controller 780 may heat the susceptor 110 by controlling the current 1030 supplied to the coil 130, and/or the matching frequency 1040, according to the second target temperature Te2.

According to an embodiment, in the smoking section, while the duty 1050 of the power converter 751 is maintained at the second duty, the controller 780 may perform the feedback control based on the difference between the temperature 1020 of the susceptor 110 and the second target temperature Te2.

As described above, the aerosol-generating device 100 according to an embodiment may improve its power efficiency by changing the operation mode of the power converter 751 according to the temperature profile.

The aerosol-generating device 100 may maximize the energy efficiency by setting the first target temperature Te1 to be higher than the second target temperature Te2 and synchronizing the section change of the temperature profile with the operation mode change.

In detail, because the power converter 751 includes the switching elements, the temperature of the susceptor 110 may decrease at the time of changing the operation mode because of a software problem such as signal latency or a hardware problem such as an on/off delay of the switching elements.

In this regard, the controller 780 may set the first target temperature Te1 to be higher than the second target temperature Te2 and may change the operation mode of the power converter 751 at the time when the first target temperature Te1 is changed to the second target temperature Te2. Because the second target temperature Te2 is lower than the first target temperature Te1, the additional power for maintaining the temperature 1020 of the susceptor 110 at the target temperature 1010 may greatly decrease. Accordingly, the energy loss of the power converter 751 may be minimized.

Figure 11:
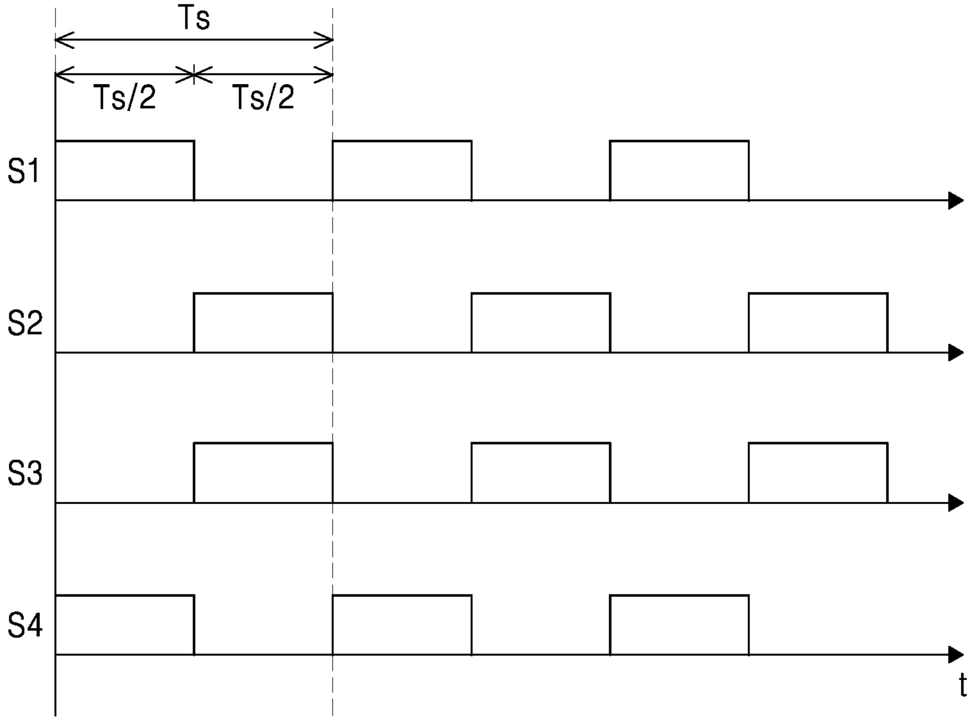
FIG. 11 is a diagram illustrating an operation method of switching elements in a first mode.
Figure 12:
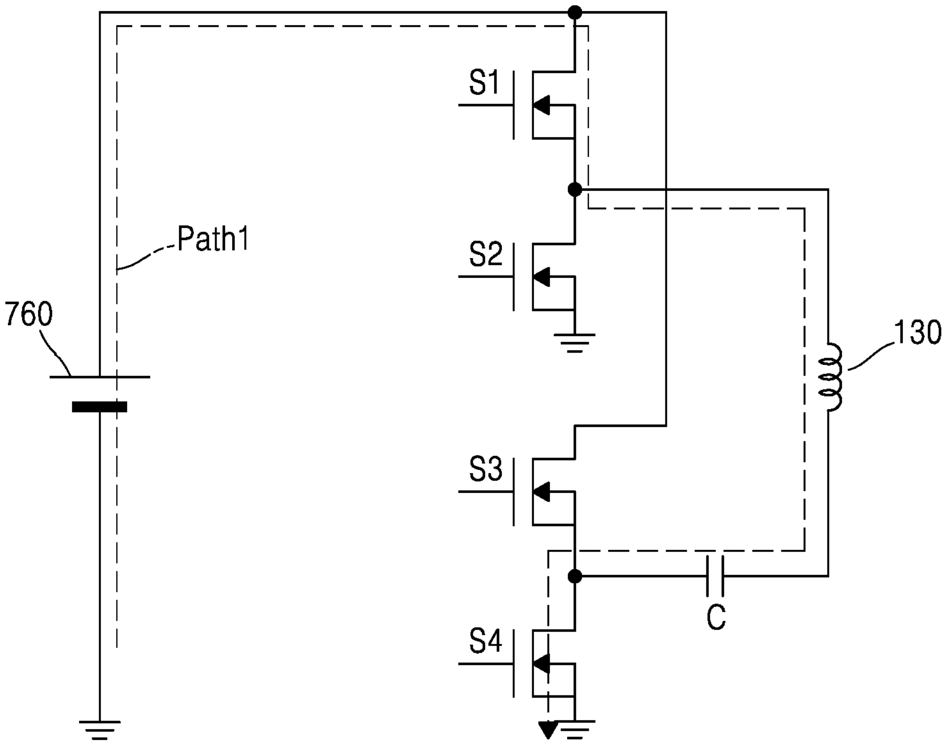
FIGS. 12 and 13 are diagrams illustrating a current flow according to operation of the switching elements in the first mode.
Figure 13:
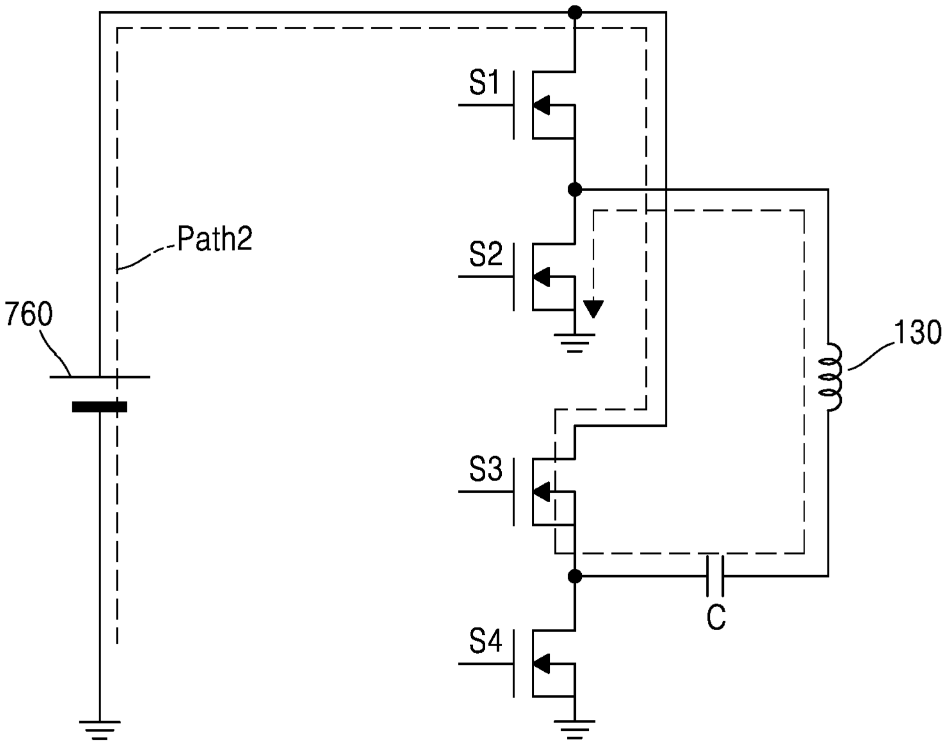

FIG. 11 is a diagram for explaining an operation method of switching elements in the first mode. FIGS. 12 and 13 are diagrams for explaining a current flow according to operation of the switching elements in the first mode.

Referring to FIGS. 11 to 13, the controller 780 may control the switching elements S1 to S4 to make the power converter 751 operate as a full-bridge circuit in the first mode. In the first mode, the controller 780 may complementarily operate the switching elements S1 to S4 included in lags, respectively.

The controller 780 may turn on the first switching element S1 and the fourth switching element S4 and may turn off the second switching element S2 and the third switching element S3 in a half period Ts/2 of the switching period Ts. Accordingly, a current may flow through the battery 760, the first switching element S1, the coil 130, the capacitor C, and the fourth switching element S4, along a first current path Path1 (see FIG. 12).

The controller 780 may turn on the second switching element S2 and the third switching element S3 and turn off the first switching element S1 and the fourth switching element S4 in the other half period Ts/2 of the switching period Ts. Accordingly, a current may be flow through the battery 760, the third switching element S3, the capacitor C, and the coil 130, and the second switching element S2, along a second current path Path2.

An output from the power converter 751 in the first mode may be greater than that from the power converter 751 in the second mode that is described below. Therefore, a duty in the first mode may be less than a duty in the second mode to easily decrease the temperature of the susceptor 110. In the preheating section, as the power converter 751 operates as the full-bridge circuit with a great output, the rapid preheating may be performed.

Figure 14:
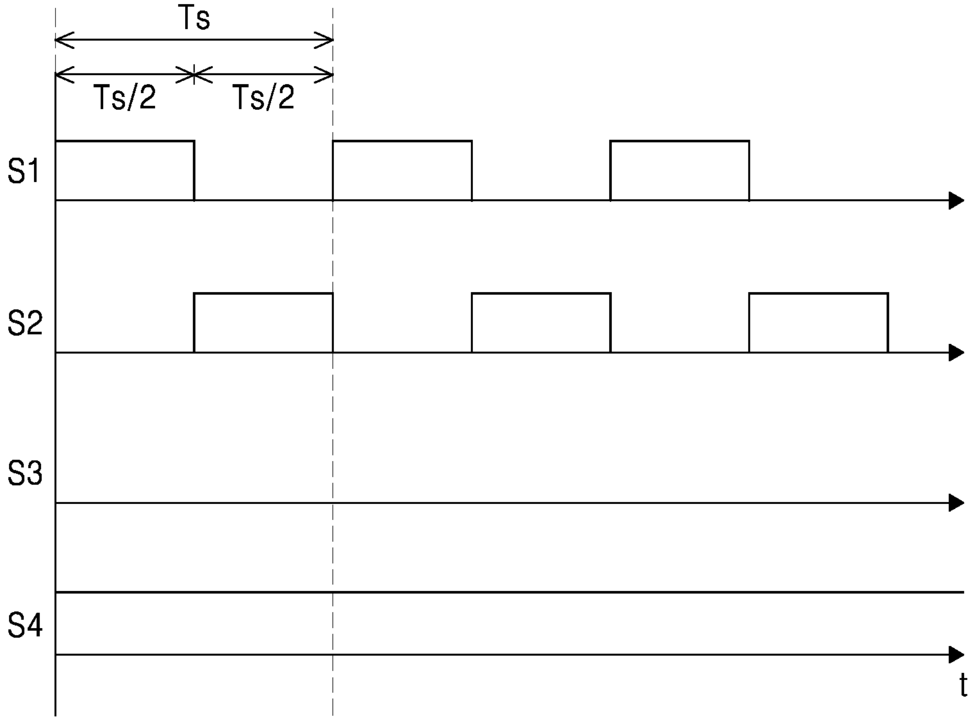
FIG. 14 is a diagram illustrating an operation mode of switching elements in a second mode.
Figure 15:
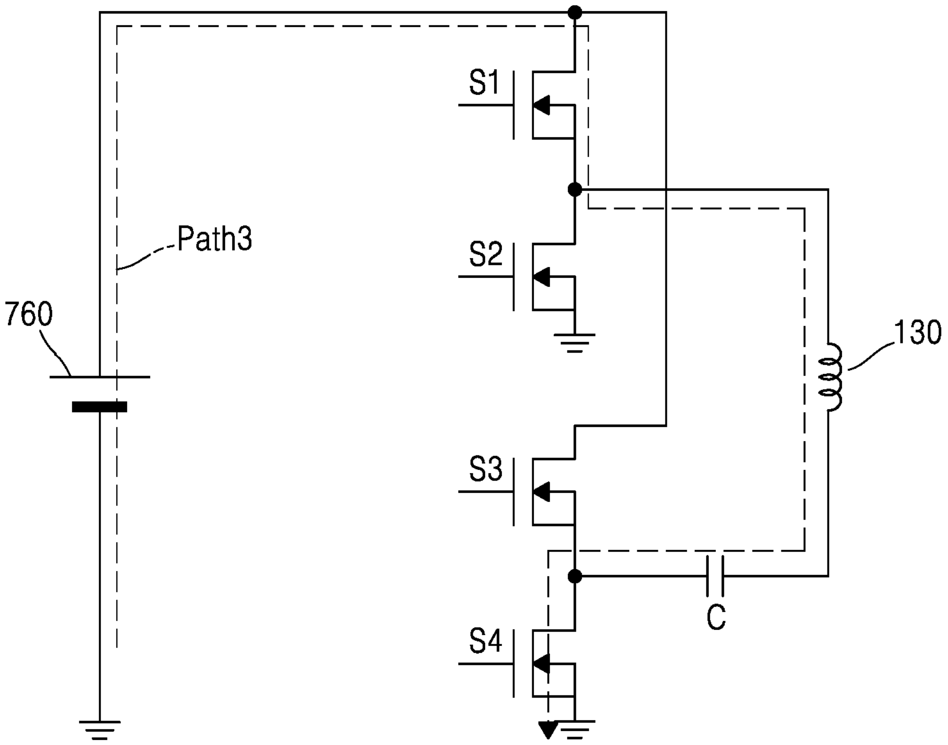
FIGS. 15 and 16 are diagrams illustrating a current flow according to operation of the switching modes in the second mode.
Figure 16:
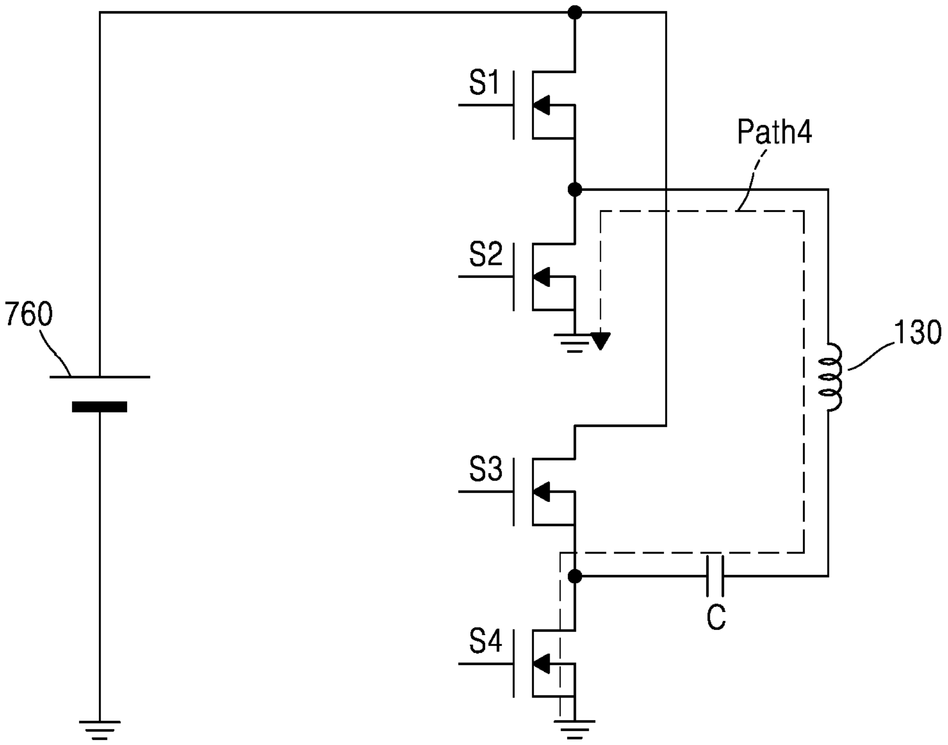

FIG. 14 is a diagram for explaining an operation mode of switching elements in a second mode. FIGS. 15 and 16 are diagrams for explaining a current flow according to the operation of the switching modes.

Referring to FIGS. 14 to 16, the controller 780 may control the switching elements S1 to S4 to make the power converter 751 operate as the half-bridge circuit in the second mode. The controller 780 may keep turning on/off the switching elements S3 and S4 included in any one lag in the second mode and may complementarily operate the switching elements S1 and S2 included in the other lag.

The controller 780 may turn on the first switching element S1 and the fourth switching element S4 and turn off the second switching element S2 and the third switching element S3 in the half period Ts/2 of the switching period Ts. Accordingly, the current may flow through the battery 760, the first switching element S1, the coil 130, the capacitor C, and the fourth switching element S4, along a third current path Path3 (see FIG. 15).

The controller 780 may turn on the second switching element S2 and the fourth switching element S4 and turn off the first switching element S1 and the third switching element S3 in the other half period Ts/2 of the switching period Ts. Accordingly, the current may flow through the fourth switching element S4, the capacitor C, the coil 130, and the second switching element S2, along a fourth current path Path4 (see FIG. 16). The fourth current path Path4 may be formed by energy stored in the capacitor C during the first half period Ts/2 of the switching period Ts.

FIGS. 15 and 16 only illustrate that the fourth switching element S4 is turned on, and the third switching element S3 is turned off in the entire switching period Ts. According to an embodiment, however, the fourth switching element S4 may be turned off, and the third switching element S3 may be turned on.

In the second mode, the second duty may be set so that the power converter 751 may have the maximum efficiency. For example, in the second mode, the second duty may be set to be about 50%.

Figure 17:
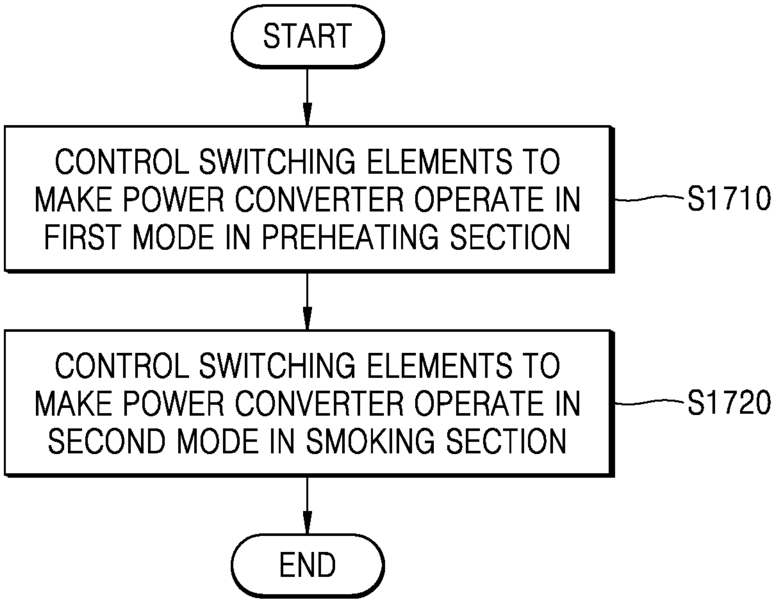
FIG. 17 is a flowchart of an operation method of an aerosol-generating device, according to an embodiment.

FIG. 17 is a flowchart of an operation method of an aerosol-generating device, according to an embodiment.

Referring to FIG. 17, in operation S1710, in the preheating section, the controller 780 may control the switching elements to make the power converter 751 operate in the first mode.

The preheating section may be a section in which the temperature 1020 of the susceptor 110 increases to the first target temperature. The first mode may be a mode in which the power converter 751 operates as the full-bridge circuit.

The half-bridge circuit described below has lower output than the full-bridge circuit, and thus, if the power converter 751 operates as the half-bridge circuit from the preheating section, the preheating performance (e.g., a preheating time, a preheating temperature, etc.) may not satisfy a desired degree. Therefore, it is preferable that the aerosol-generating device 100 operates the power converter 751 as the full-bridge circuit having a high output value in the preheating section.

The controller 780 may control the power converter 751 to make the temperature of the susceptor 110 increase to the first target temperature, in the preheating section.

The preheating section may be divided into the first sub-section and the second sub-section following the first sub-section. The first sub-section may be set such that the temperature of the susceptor 110 is in a range of about (Te1-200) ° C. to about (Te1-30) ° C.

In the first sub-section, the controller 780 may control the power converter 751 based on the first sub-mode. The first sub-mode may be a mode in which the current supplied to the coil 130 is kept under an upper limit to remove the ripple components.

In the first sub-section, the controller 780 may control the duty based on the target temperature while limiting the upper limit of the supply current supplied to the coil 130 and maintaining the matching frequency at a fixed value. In the first sub-section, as the magnitude of the supplied current is limited to be less than or equal to the preset reference current, the damage to the battery 460 may be prevented.

In the second sub-section after the first sub-section, the controller 780 may control the power converter 751 based on the second sub-mode. The second sub-mode may be a mode in which the current is not limited for the rapid preheating. Also, the second sub-mode may be a mode in which the temperature feedback control is performed to make the temperature 1020 of the susceptor 110 reach the first target temperature.

In the second sub-section, while the duty of the power converter 751 is fixed at the first duty, the controller 780 may heat the susceptor 110 by controlling at least any one of the current supplied to the coil 130 and the matching frequency based on the first target temperature. In the second sub-mode, the controller 780 may perform the feedback control based on the difference between the temperature of the susceptor 110 and the first target temperature.

Because the first sub-mode and the second sub-mode correspond to the operation modes in the preheating section, the power converter 751 may operate as the full bridge circuit in both the first sub-mode and the second sub-mode.

In operation S1720, the controller 780 may control the switching elements to make the power converter 751 operate according to the second mode in the smoking section after the preheating section.

The smoking section may be a mode in which the user's puffs actually occur and the temperature of the susceptor 110 is maintained in a preset smoking temperature range. The second mode may be a mode in which the power converter 751 operates as the half-bridge circuit. Also, the second mode may be a mode in which the power converter 751 operates with its maximum power efficiency to maintain the temperature of the susceptor 110.

In the smoking section, the controller 780 may control the power converter 751 to maintain the temperature of the susceptor 110 at the second target temperature.

The controller 780 may fix the duty of the power converter 751 at the second duty, in the smoking section. The second duty may be set to be greater than the first duty. The second duty may be set for the maximum power efficiency of the power converter 751. For example, the second duty may be set to be about 50%.

In the smoking section, while the duty of the power converter 751 is fixed at the second duty, the controller 780 may heat the susceptor 110 by controlling at least any one of the current supplied to the coil 130 and the matching frequency based on the second target temperature. According to an embodiment, in the smoking section, while the duty of the power converter 751 is fixed at the second duty, the controller 780 may perform the feedback control based on the difference between the temperature of the susceptor 110 and the second target temperature.

The half-bridge circuit has lower output than the full-bridge circuit, but maintaining a smoking temperature is more important than rapid heating in the smoking section, and thus, the half-bridge circuit may be good enough to maintain the temperature. In addition, the energy efficiency may greatly increase compared to when the power converter 751 only operates as the full-bridge circuit in the entire heating section.

Therefore, the aerosol-generating device 100 according to an embodiment may improve a power efficiency by changing the operation mode of the power converter 751 according to the temperature profile.

For the maximum energy efficiency, the aerosol-generating device 100 may set the first target temperature to be higher than the second target temperature and may synchronize a section change of the temperature profile with the operation mode change.

In detail, the controller 780 may change the operation mode of the power converter 751 from the first mode to the second mode at the time when the preheating section is changed to the smoking section. The target temperature may be set to be the first target temperature in the preheating section and the second target temperature in the smoking section. Thus, the time when the preheating section is changed to the smoking section may be the same as the time when the first target temperature is changed to the second target temperature. In other words, the controller 780 may change the operation mode of the power converter 751 at the time when the first target temperature is changed to the second target temperature. As the operation mode is changed at the time when the target temperature drops, the energy efficiency may be maximized.

Those of ordinary skill in the art related to the present embodiments may understand that various changes in form and details can be made therein without departing from the scope of the characteristics described above. The disclosed methods should be considered in a descriptive sense only and not for purposes of limitation. The scope of the present disclosure is defined by the appended claims rather than by the foregoing description, and all differences within the scope of equivalents thereof should be construed as being included in the present disclosure.

The invention claimed is:

1. An aerosol-generating device in which an accommodation space for accommodating an aerosol-generating substrate is formed, wherein a susceptor included in the aerosol-generating substrate is heated in an induction heating method, the aerosol-generating device comprising:

- a battery for supplying direct current (DC) power;
- a power converter including at least one switching element and configured to convert the DC power into alternating current (AC) power;
- a coil that is wound along the accommodation space, extends in a lengthwise direction of the aerosol-generating device, and is configured to heat the susceptor by applying an alternating magnetic field, of which a direction periodically changes, to the susceptor included in the aerosol-generating substrate according to the AC power converted by the power converter; and
- a controller configured to control a time to supply a current to the coil in a state where a duty and a frequency of the current are fixed so that a temperature of the susceptor reaches a target temperature that is preset.

2. The aerosol-generating device of claim 1, wherein the controller is further configured to control the time to supply the current to the coil based on the target temperature in a state where the duty of the current is fixed to a first duty that is preset.

3. The aerosol-generating device of claim 2, wherein the first duty is set to be 50%.

4. The aerosol-generating device of claim 1, further comprising a capacitor element connected in series or parallel to the coil to be inductively coupled to the susceptor.

5. The aerosol-generating device of claim 4, wherein the frequency of the current is set based on resonance frequencies of the coil and the capacitor element.

6. The aerosol-generating device of claim 5, wherein the frequency of the current is set to be higher than the resonance frequencies of the coil and the capacitor element by as much as a preset magnitude.

7. The aerosol-generating device of claim 1, wherein the coil is a solenoid wound along the accommodation space, and includes at least one of copper, silver, gold, aluminum, tungsten, zinc, and nickel.

8. The aerosol-generating device of claim 1, wherein the battery includes lithium iron phosphate.

9. The aerosol-generating device of claim 1, further comprising an interface unit including a port for exchanging data with an external device or receiving power from an external power.

* * * * *